(12) United States Patent
Yamazaki

(10) Patent No.: US 7,664,914 B2
(45) Date of Patent: Feb. 16, 2010

(54) HIERARCHICAL CONTROL APPARATUS OF HIERARCHICAL STORAGE SYSTEM AND METHOD FOR MAINTAINING AND MANAGING DUPLEXED MEDIA

(75) Inventor: Fumio Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 11/527,547

(22) Filed: Sep. 27, 2006

(65) Prior Publication Data
US 2007/0276998 A1 Nov. 29, 2007

(30) Foreign Application Priority Data
May 26, 2006 (JP) .............................. 2006-146271

(51) Int. Cl.
*G06F 21/00* (2006.01)
(52) U.S. Cl. ...................................... 711/114; 711/162
(58) Field of Classification Search .................. 711/114, 711/162
See application file for complete search history.

(56) References Cited

U.S. PATENT DOCUMENTS 5,983,318 A 11/1999 Yamazaki et al.

FOREIGN PATENT DOCUMENTS

| JP | 5-204557 | 8/1993 |
| JP | 7-230358 | 8/1995 |
| JP | 07230358 | * 8/1995 |
| JP | 8-63857 | 3/1997 |
| JP | 2004-86251 | 3/2004 |

OTHER PUBLICATIONS

Office Action mailed on May 7, 2008 and issued in corresponding Japanese Patent Application No. 2006-146271.

* cited by examiner

*Primary Examiner*—Sheng-Jen Tsai
*Assistant Examiner*—John P Fishburn

(57) ABSTRACT

A control unit of a hierarchical control apparatus holds information in which one of duplexed library apparatuses is set as a master and the other is set as a slave for each medium in each of the duplexed library apparatuses, and statistical information about each of the library apparatuses. The control unit includes an automatic redundant copy unit detecting that a statistical information of a medium reaches a predetermined amount, replacing the medium with a free medium, and copying data to the free medium, a master/slave setting unit setting the medium to which the data is copied and the other medium as a master or a slave such that a load is even between the duplexed library apparatuses according to the statistical information, and a unit copying and reading the requested data to the disk array apparatus by prioritizing one of the duplexed library apparatuses including the medium set as a master when there is no requested data in the disk array apparatus.

3 Claims, 6 Drawing Sheets

---

A. FOR EACH TAPE DRIVE
   A1 TOTAL AMOUNT OF WRITE DATA
   A2 TOTAL AMOUNT OF READ DATA
   A3 TOTAL FREQUENCY OF MOUNT

B. FOR EACH TAPE MEDIUM
   B1 TOTAL AMOUNT OF WRITE DATA
   B2 TOTAL AMOUNT OF READ DATA
   B3 TOTAL FREQUENCY OF MOUNT

C. DIFFERENCE STATISTICAL INFORMATION
   C1 TOTAL FREQUENCY OF MOUNT FOR EACH TAPE DRIVE
   C2 TOTAL AMOUNT OF WRITE FOR EACH TAPE DRIVE
   C3 TOTAL AMOUNT OF READ FOR EACH TAPE DRIVE
   C4 TOTAL AMOUNT OF MOUNT PROCESSING TIME FOR EACH TAPE DRIVE
   C5 TOTAL AMOUNT OF WRITE PROCESSING TIME FOR EACH TAPE DRIVE
   C6 TOTAL AMOUNT OF READ PROCESSING TIME FOR EACH TAPE DRIVE

FIG.4

A. FOR EACH TAPE DRIVE

A1  TOTAL AMOUNT OF WRITE DATA

A2  TOTAL AMOUNT OF READ DATA

A3  TOTAL FREQUENCY OF MOUNT

B. FOR EACH TAPE MEDIUM

B1  TOTAL AMOUNT OF WRITE DATA

B2  TOTAL AMOUNT OF READ DATA

B3  TOTAL FREQUENCY OF MOUNT

C. DIFFERENCE STATISTICAL INFORMATION

C1  TOTAL FREQUENCY OF MOUNT FOR EACH TAPE DRIVE

C2  TOTAL AMOUNT OF WRITE FOR EACH TAPE DRIVE

C3  TOTAL AMOUNT OF READ FOR EACH TAPE DRIVE

C4  TOTAL AMOUNT OF MOUNT PROCESSING TIME FOR EACH TAPE DRIVE

C5  TOTAL AMOUNT OF WRITE PROCESSING TIME FOR EACH TAPE DRIVE

C6  TOTAL AMOUNT OF READ PROCESSING TIME FOR EACH TAPE DRIVE

HIERARCHICAL CONTROL APPARATUS OF HIERARCHICAL STORAGE SYSTEM AND METHOD FOR MAINTAINING AND MANAGING DUPLEXED MEDIA

CROSS-REFERENCE TO RELATED APPLICATIONS

This application claims the conventional priority based on Japanese Application No.2006-146271, filed on May 26, 2006, the disclosures of which are incorporated herein by reference.

BACKGROUND OF THE INVENTION

1. Field of the Invention

The present invention relates to a hierarchical control apparatus of a hierarchical storage system in which a disk array apparatus and a library apparatus are hierarchically confirmed, and a method for maintaining and managing duplexed media.

2. Description of the Related Art

FIG. 5 shows a structure of a conventional hierarchical storage system. In FIG. 5, numeral 50 denotes a hierarchical control apparatus, numeral 51 denotes a disk array apparatus having a plurality of hard disks 510, numerals 52-0 and 52-1 denote duplexed library apparatus, numerals 520-1 to 520-n and 521-1 to 521-n denote magnetic tapes (media) provided in the library apparatuses 52-0 and 52-1.

In the hierarchical storage system, upon receipt of a request for data and so on, one of the hard disks 510 of the disk array apparatus 51 is to access the data. However, when there is no data in the disk array apparatus 51, the data is read in from a library apparatus 52 and written to a hard disk 510 of the disk array apparatus 51. The requested data is also read from the hard disk 510.

When the disk array apparatus 51 accesses the library apparatus 52, a medium that can perform a process earlier is selected from the duplexed library apparatuses 52-0 and 52-1. Practically, a medium (magnetic tape) of the library apparatus whose drive can be available earlier is selected. When the structure of the system is small, a plurality of media in one library apparatus is duplexed, and when the disk array apparatus 51 accesses the library apparatus, a medium that is available in the duplexed media is selected. The case where a library apparatus is duplexed is explained below.

As a conventional technique of the above mentioned hierarchical storage system, an automatic redundant copy mechanism performs preventive maintenance on each of the duplexed library apparatus to be accessed by a disk array apparatus.

FIG. 6 is an explanatory view of the automatic redundant copy. In FIG. 6, reference numerals 52-0 and 52-1 correspond to the identical reference numerals shown in FIG. 5, and reference numerals 520-1 and 521-1 denote duplexed tape media provided for the library apparatuses 52-0 and 52-1, respectively, and the same contents are stored in the tape medium 520-1 and 521-1. Reference numerals 521-2 to 521-n denote free media in the library apparatus 52-1.

The automatic redundant copy mechanism (also referred to as a tape redundant copy mechanism corresponding to a magnetic tape) copies data to another tape medium before a recording medium (tape medium) becomes faulty, and is the function of renewing a tape medium.

The outline of the process of the automatic redundant copy is described below.

1: The statistical information (mount frequency, write frequency, read frequency, total processing time and so on for each tape medium) of a tape medium is recorded and held in the hierarchical control apparatus 50 shown in FIG. 5, and the hierarchical control apparatus checks whether or not the statistical information exceeds a threshold prescribed by a predetermined frequency or processing time. When the statistical information exceeds the threshold, the hierarchical control apparatus determines that it is necessary to replace a tape medium (perform a preventive maintenance). In the example shown in FIG. 6, it is assumed that the tape medium 521-1 in the library apparatus 52-1 has reached a replacement time.

2: When the replacement time is reached, one of the free media in the same library apparatus is acquired. In the example shown in FIG. 6, a free tape medium in the library apparatus 52-1 is selected, and it is assumed that a new tape medium 521-m (m<n) has been acquired.

3: All file data in the original tape medium (old medium) is copied to the acquired medium (new medium). In the example shown in FIG. 6, all file data recorded on the tape medium 521-1 as an old medium is copied to the acquired tape medium 521-m. The data can also be copied from the tape medium 520-1 of the other library apparatus 52-0 in the duplexed apparatuses.

4: When all data are completely copied, the acquired tape medium is registered as a tape medium to be used (in a status of being assigned). In the example shown in FIG. 6, the tape medium 521-m to which data is copied is set as a new duplexed tape medium for the tape medium 520-1 in the library apparatus 52-1.

5: The originally used tape medium is managed as a medium in a faulty state (faulty medium). In the example shown in FIG. 6, the old tape medium 521-1 of the library apparatus 52-1 is managed as a faulty medium.

A conventional duplexed control apparatus of the information record regeneration apparatus for shortening the medium replacement time for a duplexed recording medium reads data with redundancy using two media on which a mirroring process (copying data to a new medium when the data is updated in an old medium) is performed. The duplexed control apparatus saves the data temporarily when a medium is replaced, and terminates the replacement when a medium of an active system is replaced. Then, the duplexed control apparatus replaces a medium in the standby system and performs a high-speed positioning to a tape position in the active system, and regains the redundancy automatically, thereby duplexing a magnetic tape and holding redundancy without performing a complicated process by an upper apparatus and an operator and so on, and without reduction in performance when a medium is replaced (refer to Patent Document 1: Japanese Patent Laid-Open No. 2004-86251).

When a duplexed library apparatus in a hierarchical storage system is accessed, one available apparatus is accessed. Therefore, there is not a large difference in use frequency (or total processing time) between the duplexed apparatuses, and a well-balanced value is obtained. As a result, when the automatic redundant copy mechanism is started according to a statistical information of a media, there is the possibility that the two duplexed media storing the same information can be replaced for preventive maintenance at the same time.

In the technique of the above described Patent Document 1, when a medium of the active system is replaced, the medium of the standby system is simultaneously replaced. Therefore, it is different from the system such as an automatic redundant copy mechanism and so on for replacing only one of the duplexed media when the time of preventive maintenance comes.

Since the automatic redundant copy mechanism is started according to the statistical information, there is the possibility that both of the two duplexed media are evenly used, thereby allowing with high probability the automatic redundant copy mechanism to simultaneously perform preventive maintenance on the two duplexed media. In this case, there is the strong possibility of a user data lost (loss of data) due to a fault of a medium during simultaneous preventive maintenance on the two duplexed media.

SUMMARY OF THE INVENTION

It is an object of the present invention to provide a hierarchical control apparatus of a hierarchical storage system in which a disk array apparatus and a library apparatus are hierarchically configured capable of reducing the possibility of user data lost in performing automatic redundant copy for preventive maintenance.

It is another object of the present invention to provide a method for maintaining and managing duplexed media capable of reducing the possibility of user data lost in performing automatic redundant copy for preventive maintenance.

The hierarchical control apparatus of the present invention is the hierarchical control apparatus of a hierarchical storage system in which a disk array apparatus and a library apparatus having a plurality of media are hierarchically configured. The hierarchical control apparatus comprises a control unit holding information in which one of duplexed library apparatuses is set as a master and the other is set as a slave for each medium in each of the duplexed library apparatuses, and statistical information of the library apparatuses including processing time. The control unit comprises an automatic redundant copy unit detecting that the statistical information of a medium reaches a predetermined amount, replacing the medium with a free medium, and copying data to the free medium, a master/slave setting unit setting the medium on which the automatic redundant copy is performed and a medium of the other library apparatus as a master or a slave such that a load is even between the duplexed library apparatuses according to the statistical information, and an access unit reading data when there is the data in the disk array apparatus at an external request for the data, and, when there is not the data in the disk array apparatus, retrieving the requested data from one of the duplexed library apparatuses including the medium set as a master, and copying the requested data to the disk array apparatus.

The method for maintaining and managing duplexed media of the present invention is the method for maintaining and managing duplexed media using a hierarchical control apparatus of a hierarchical storage system in which a disk array apparatus and a library apparatus having a plurality of media are hierarchically configured. The method comprises holding, in a control unit provided in the hierarchical control apparatus, information in which one of duplexed library apparatuses is set as a master and the other is set as a slave for each medium in each of the duplexed library apparatuses, and statistical information of the library apparatuses including processing time, detecting, in the control unit, that the statistical information of a medium reaches a predetermined amount, activating an automatic redundant copy unit provided in the control unit to perform an automatic redundant copy by replacing the medium with a free medium, and copying data to the free medium, setting, in the control unit, the medium on which the automatic redundant copy is performed and a medium of the other library apparatus as a master or a slave such that a load is even between the duplexed library apparatuses according to the statistical information, and reading, in the control unit, data when there is the data in the disk array apparatus at an external request for the data, and, when there is not the data in the disk array apparatus, retrieving the requested data from one of the duplexed library apparatuses including the medium set as a master, and copying the requested data to the disk array apparatus.

Preferably, the method for maintaining and managing duplexed media of the present invention is the method for maintaining and managing duplexed media using a hierarchical control apparatus of a hierarchical storage system in which a disk array apparatus and a library apparatus having a plurality of media are hierarchically configured. The method comprises holding, in a control unit provided in the hierarchical control apparatus, information in which one of duplexed media is set as a master and the other is set as a slave, and statistical information of the media including processing time, detecting, in the control unit, that the statistical information of a medium reaches a predetermined amount, activating an automatic redundant copy unit provided in the control unit to perform an automatic redundant copy by replacing the medium with a free medium, and copying data to the free medium, setting, in the control unit, the medium on which the automatic redundant copy is performed and the other medium as a master or a slave such that a load is even between the duplexed media according to the statistical information, and retrieving, in the control unit, requested data from one of the duplexed media set as a master, and copying the requested data to the disk array apparatus when there is not the requested data externally requested in the disk array apparatus.

According to the hierarchical control apparatus, the method for maintaining and managing a duplexed medium of the present invention, by prioritizing a master in the relationship between a master and a slave when data is read from media forming a duplexed system, the possibility of a user data lost can be reduced when automatic redundant copy is performed for preventive maintenance. Furthermore, since the load status of the library apparatus is referred to determine a master medium, a biased load of the library apparatus can be avoided.

BRIEF DESCRIPTION OF THE DRAWINGS

FIG. 4 shows a structure of statistical information held in the hierarchical control apparatus.

DETAILED DESCRIPTION OF THE PREFERRED EMBODIMENTS

Figure 1:
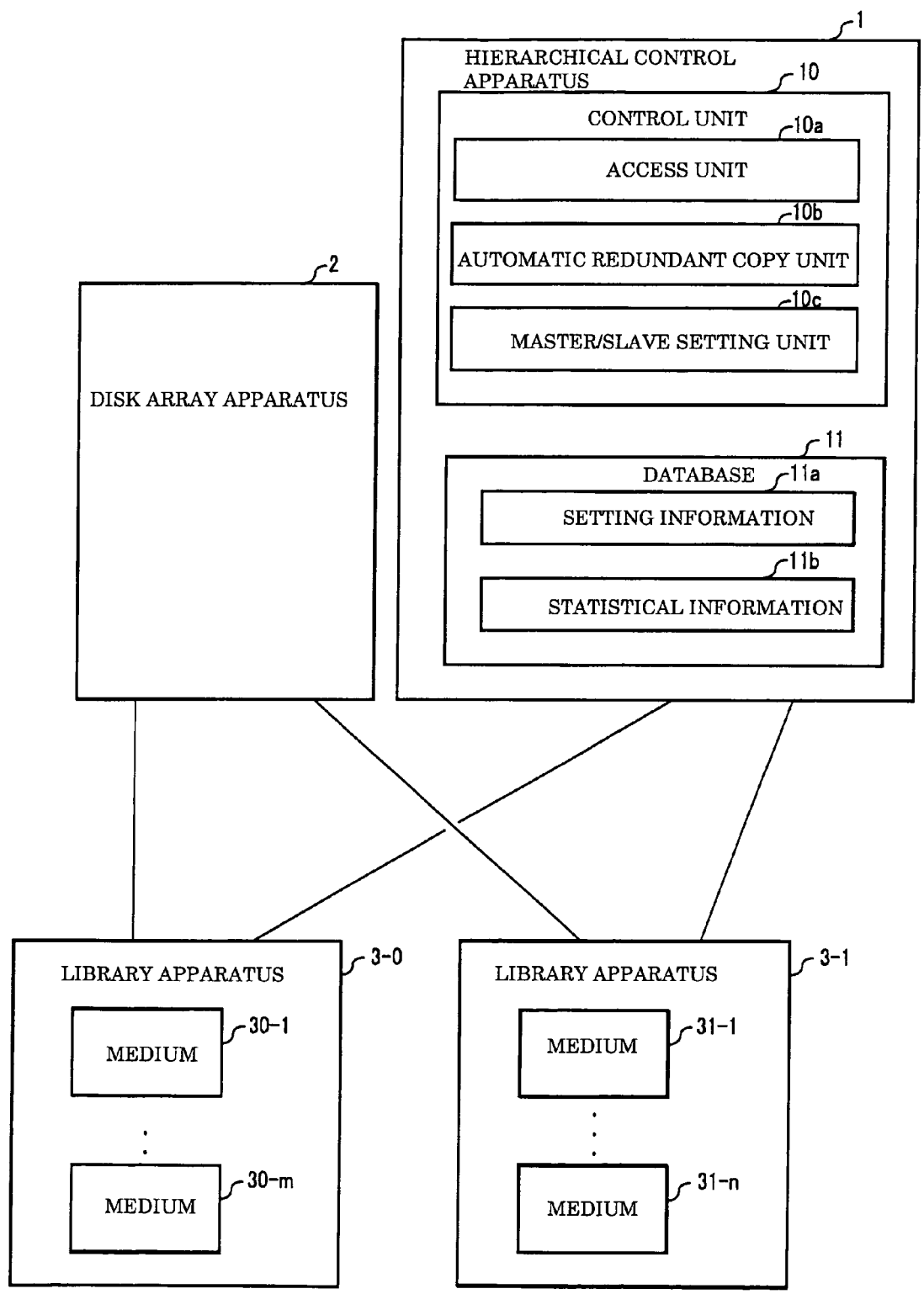
FIG. 1 shows a structure of a principle of the present invention.

FIG. 1 shows a structure of a principle of the present invention. The structure shown in FIG. 1 includes a hierarchical control apparatus 1, a control unit 10, an access unit 10a, an automatic redundant copy unit 10b, a master/slave setting unit 10c, a database 11, setting information 11a indicating whether each of the duplexed library apparatus is a master or a slave, statistical information 11b about each of the duplexed library apparatuses, a disk array apparatus 2, duplexed library apparatuses 3-0 and 3-1. Media 30-1 to 30-m and media 31-1 to 31-n is media respectively provided in the library apparatuses 3-0 and 3-1 to and from which data can be written and read. The medium 30-1 to 30-m and medium 31-1 to 31-n include a storage medium such as a magnetic tape, an optical disk and so on, and may include a drive thereof. When the library apparatus is not duplexed, control can be performed based on the similar principle by providing a duplexed configuration with at least two medium drives in one library apparatus. However, the structure shown in FIG. 1 and the following explanation relate to the case in which a library apparatus is duplexed.

In the hierarchical control apparatus 1, the master/slave setting unit 10c sets each of the duplexed library apparatuses 3-0 and 3-1 as a master or a slave for each medium in the duplexed library apparatuses 3-0 and 3-1, and stores information on the master or the slave in advance as the setting information 11a in the database 11. That is, the library apparatus including a medium set as a master (master medium) is set as a master (master library apparatus) for the master medium and the library apparatus including a medium set as a slave (slave medium) is set as a slave (slave library apparatus) for the slave medium. When a request for file data occurs, the access unit 10a of the hierarchical control apparatus 1 accesses the disk array apparatus 2. However, when no file data is present in the disk array apparatus 2, the file data is copied from the library apparatus to the disk array apparatus 2 as follows. That is, the access unit 10a refers to the setting information 11a in the database 11, identifies the library apparatus (the library apparatuses 3-0 or 3-1) set as the current master, retrieves the requested file data from the identified library apparatus including a master medium, and copies the file media to the disk array apparatus 2. The file data is transmitted from the disk array apparatus 2 to the requesting side. When the file data is written to the library apparatus on the master side, it is obvious that the same contents are written to the library apparatus on the slave side. Each time the library apparatuses 3-0 and 3-1 are accessed, the statistical information 11b in the database 11 is updated.

The automatic redundant copy unit 10b of the hierarchical control apparatus 1 checks the statistical information 11b in the database 11. When the automatic redundant copy unit 10b determines that a medium reaches the time to perform automatic redundant copy (exceeds a predetermined value), the automatic redundant copy unit 10b retrieves a free media in the library apparatus (the library apparatus 3-1 in this explanation) to be a target of the automatic redundant copy according to the conventional technique (refer to FIG. 6), and copies all file data in the medium of the other library apparatus 3-0 of the duplexed system to the media. Then, the master/slave setting unit 10c performs settings of a master and a slave for the duplexed medium to which the file data is copied. At this time, the medium of a library apparatus having a smaller load is defined as a master medium.

Figure 2:
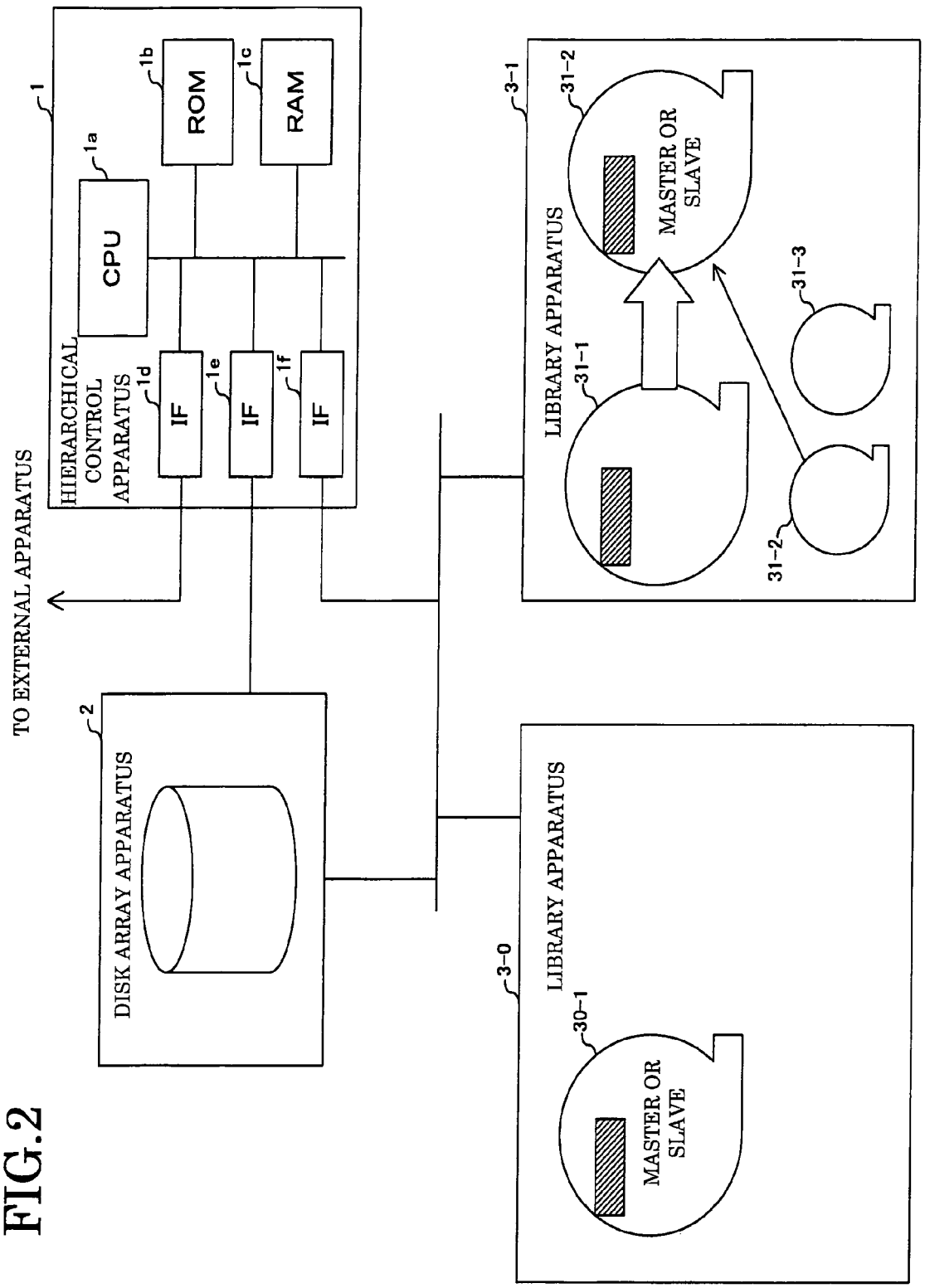
FIG. 2 shows a structure of an embodiment of the present invention.

FIG. 2 shows a structure of an embodiment of the present invention. In FIG. 2, the numerals 1, 2, 3-0, and 3-1 denote the same components as components having same numerals shown in FIG. 1. That is, numeral 1 denotes the hierarchical control apparatus 1, numeral 2 denotes the disk array apparatus 2, and numerals 3-0 and 3-1 denote the library apparatuses 3-0 and 3-1. In this embodiment, a magnetic tape is used as a medium of the library apparatus. Numeral 1a denotes a CPU (central processing unit) in the hierarchical control apparatus 1, numeral 1b denotes ROM storing a program, numeral 1c denotes RAM for development of a program and storing the statistical information 11b in the database 11 shown in FIG. 1 and the setting information 11a and so on about a master and a slave for the library apparatus (or a medium duplexed in one library apparatus). In this embodiment, the library apparatus 3-0 includes the medium 30-1 of a magnetic tape, and the library apparatus 3-1 duplexed for the medium 30-1 includes the medium 31-1, and free media 31-2 and 31-3.

Figure 3:
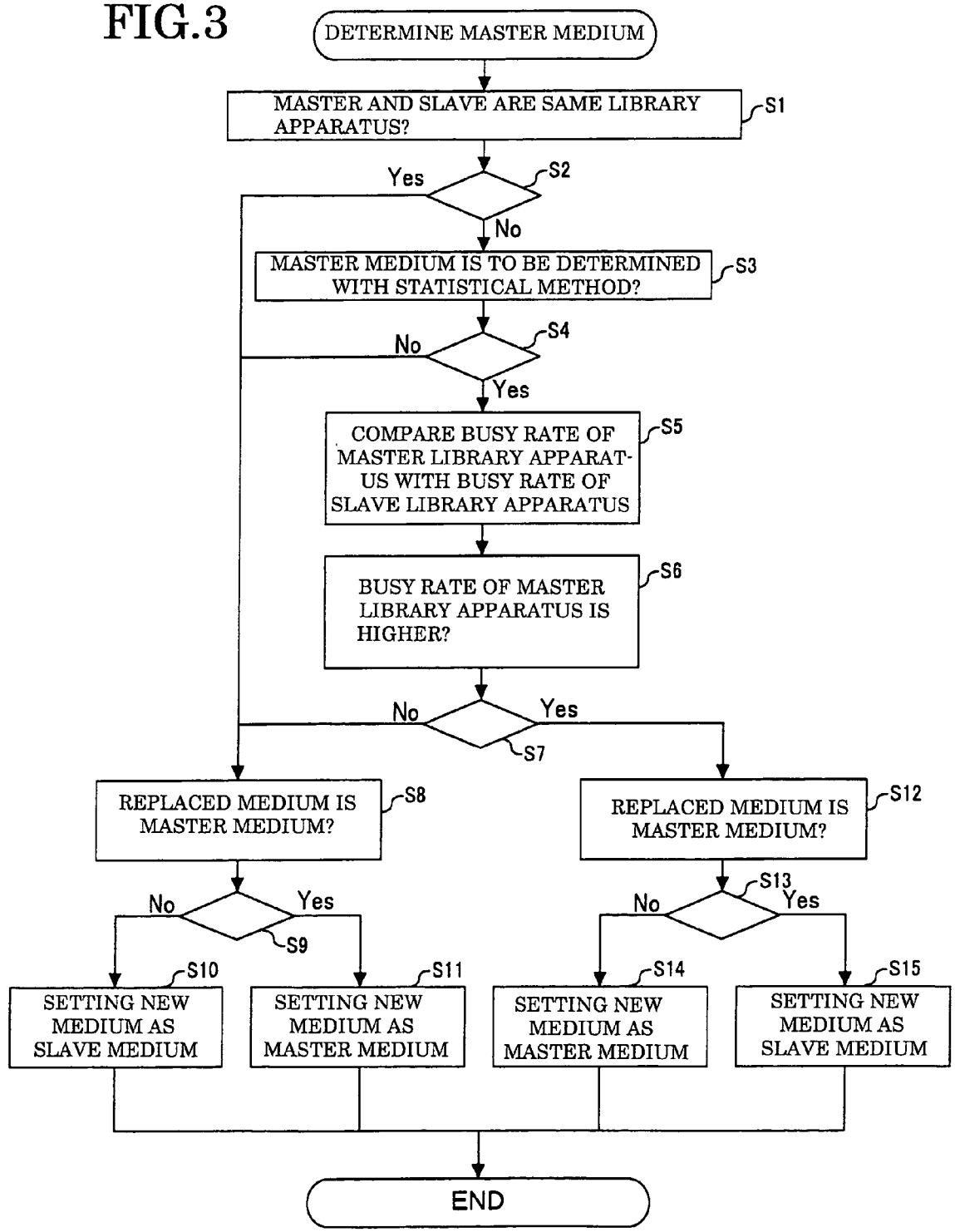
FIG. 3 is a flowchart of determining a master medium.
Figure 5:
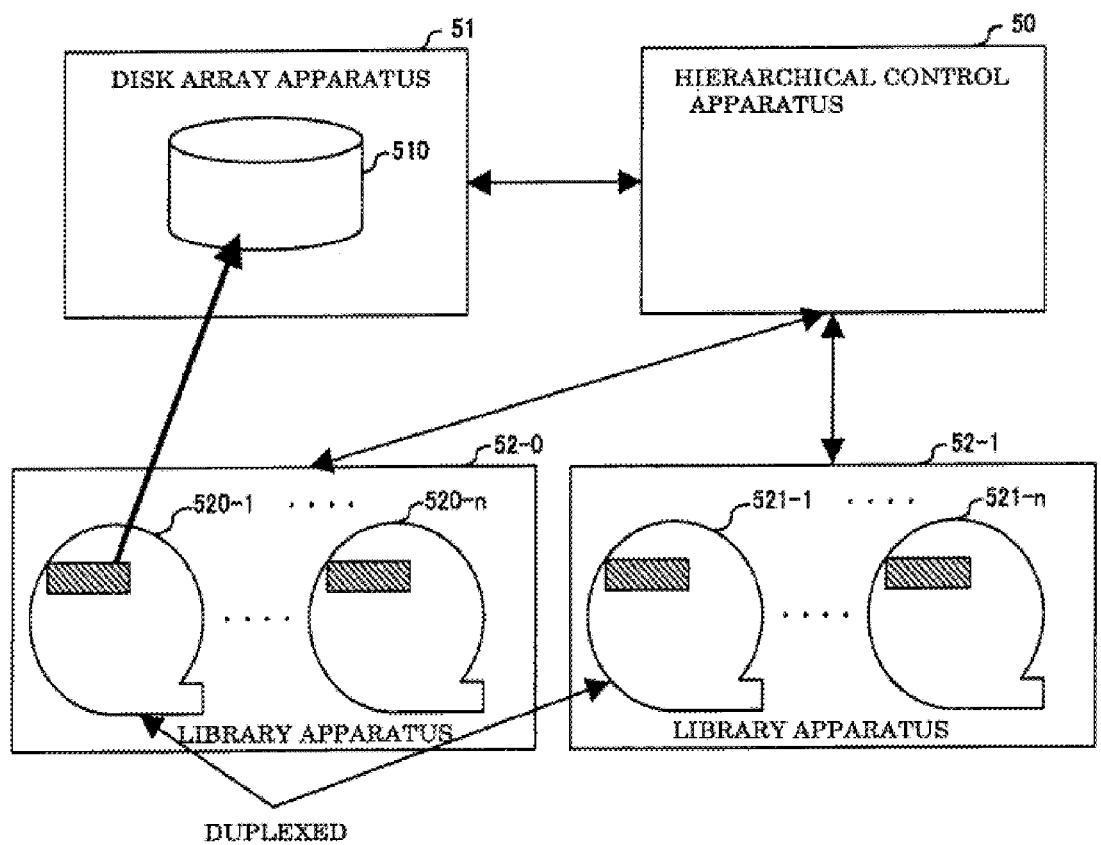
FIG. 5 shows a structure of a conventional hierarchical storage system.

FIG. 3 is a flowchart of determining a master medium. FIG. 4 shows a structure of the statistical information held in the hierarchical control apparatus. The statistical information shown in FIG. 4 is used in the flowchart shown in FIG. 3. Reference character A indicates the information for each tape drive (total past data), and includes A1 as total amount of write data, A2 as total amount of read data, A3 as the information about the total frequency of mount (attachment of tape). Reference character B indicates the information for each tape medium (total past data), and includes B1 as total amount of write data, B2 as total amount of read data, B3 as the information about the total frequency of mount. Reference character C indicates difference statistical information, and the following information is collected and stored at predetermined time intervals (for example, the default value is an hour). Reference character C1 indicates the total frequency of mount for each tape drive, C2 indicates the total amount of write, C3 indicates the total amount of read, C4 indicates the total amount of mount processing time, C5 indicates the total amount of write processing time, and C6 indicates the total amount of read processing time.

Figure 6:
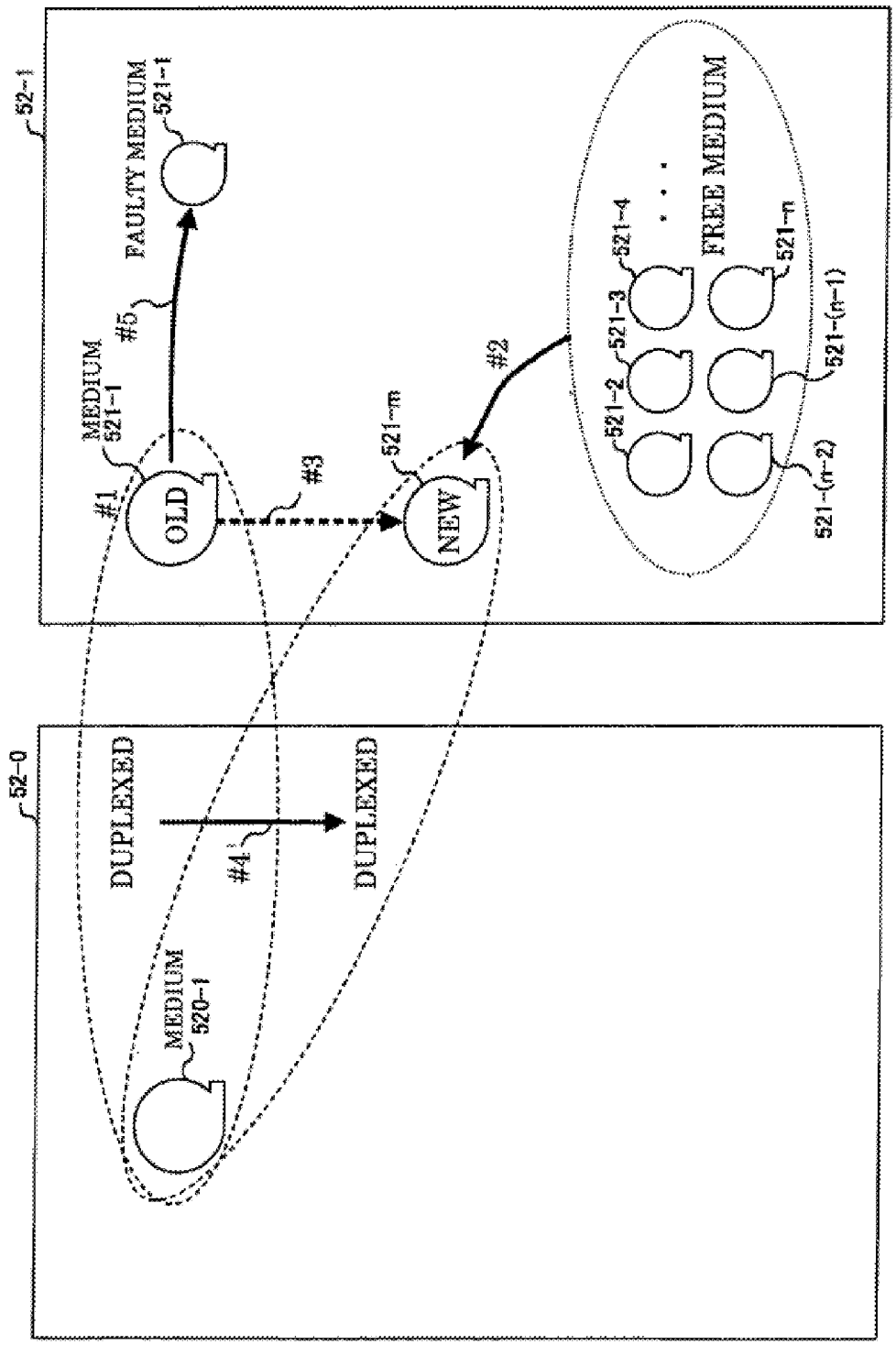
FIG. 6 is an explanatory view of automatic redundant copy.

In the CPU 1a of the hierarchical control apparatus 1 shown in FIG. 2, when it is detected by a program that an item predetermined in the statistical information B shown in FIG. 4 (for example, a total write data) reaches a predetermined amount, the process of determining the master medium shown in FIG. 3 is started after the automatic redundant copy described in FIG. 6. In the example of explanation, with the configuration shown in FIG. 2, when the statistical information about the medium 31-1 of the library apparatus 3-1 exceeds the amount of starting the automatic redundant copy, preventive maintenance is implied, the conventional process (refer to FIG. 6) is performed, the free medium 31-2 is selected, the file data of the medium 30-1 of the library apparatus 3-0 is copied to the free medium 31-2, the media are replaced, and the medium 31-1 is processed as a faulty medium.

When the process of determining a master medium is started after the automatic redundant copy is performed, it is determined whether or not the master medium and the slave medium are in the same library apparatus (S1 and S2 shown in FIG. 3). This process is performed by identifying whether the library apparatus is duplexed (there are two library apparatuses) or the medium is duplexed in one library apparatus in a case of a small system and so on by referring to the information in the memory (RAM 1c shown in FIG. 2). When it is determined that the library apparatus is not the same, it is determined whether or not a master medium is to be determined with a statistical method (S3 an S4 shown in FIG. 3). Although a master medium is normally determined with the statistical method (method according to the statistical information), it is determined whether or not other method (method of setting the same as the previous setting condition of an automatic redundant copy) is used. The method to determine the master medium is set in advance by a user (setting in the RAM 1c as the information about the master medium determining method), and a determination is made by identifying the information.

When the master medium is set to be determined in the statistical method, a busy rate of a master library apparatus is compared with a busy rate of a slave library apparatus (S5 shown in FIG. 3). The master library apparatus and the slave library apparatus are defined depending on the original setting information. The busy rate is obtained by the following formula. C4, C5, and C6 in the formula respectively represent the total mount processing time, the total write processing time, and the total read processing time for each tape drive in the statistical information shown in FIG. 4. "24 hours" in the formula can be appropriately changed.

Busy rate=[{(C4+C5+C6) in the past 24 hours}/24 hours]× 100 The obtained busy rates of the library apparatuses are compared, and it is determined whether or not the busy rate of the master library apparatus is higher (S6 and S7 shown in FIG. 3). When the busy rate of the library apparatus as a master is higher, it is determined whether or not the replaced medium is a master medium (S12 and S13 shown in FIG. 3). When the replaced medium is a master medium, a new medium is defined as a slave medium (S15). Otherwise, the new medium is defined as a master medium (S14 shown in FIG. 3).

When it is determined in the step S2 that the master and the slave are in the same library apparatus, when it is determined in the step S4 that the master medium is not determined with the statistical method, or when it is determined in the step S7 that the busy rate of the library apparatus of the master is not higher, then it is determined whether or not the replaced medium is a master medium (S8 and S9 shown in FIG. 3). When the replaced medium is a master medium, the new medium is defined as a master medium (S11 shown in FIG. 3). When the replaced medium is not a master medium, the new medium is defined as a slave medium (S10 shown in FIG. 3).

By setting the replaced medium as a master or a slave in the steps S10, S11, S14, and S15 in FIG. 3, the contents of the setting information are updated in the memory (RAM 1c shown in FIG. 2).

Thus, the automatic redundant copy is performed to replace one medium and a master and a slave are set. When a data request is subsequently issued and there is no data in the disk array apparatus of the hierarchical storage system, the medium set as a master in the duplexed library apparatus is accessed in preference to copy necessary file data to the disk array apparatus. Therefore, a replaced medium is set as a slave, and the other medium on which no automatic redundant copy is performed is set as a master. Therefore, the value (total processing time and so on) of the statistical information about the other medium (not replaced) defined as a master increases, and the difference in statistical information between the master and the slave becomes large (biased). As a result, there is the smallest possibility that both of the duplexed apparatus start the automatic redundant copy at the same time.

What is claimed is:

1. A hierarchical control apparatus of a hierarchical storage system in which a disk array apparatus and a library apparatus having a plurality of media are hierarchically configured, comprising:
a control unit holding information in which one of duplexed library apparatuses is set as a master and the other is set as a slave for each medium in each of the duplexed library apparatuses, and statistical information of the library apparatuses including processing time, wherein the control unit comprises:
an automatic redundant copy unit detecting that the statistical information of a medium reaches a predetermined amount, replacing the medium with a free medium, and copying data to the free medium;
a master/slave setting unit, when the replaced medium to which the data is copied is included in a library apparatus set as a master, setting a medium of the other library apparatus including the replaced medium as a slave and a medium of the other library apparatus as a master among the duplexed library apparatuses according to the statistical information; and
an access unit reading data when there is the data in the disk array apparatus at an external request for the data, and, when there is not the data in the disk array apparatus, retrieving the requested data from one of the duplexed library apparatuses including the medium set as a master, and copying the requested data to the disk array apparatus; wherein
the statistical information includes information of setting each of the duplexed library apparatuses as a master or a slave, and information of a total amount of written data, a total amount of read data, total processing time and a total number of mountings of each library apparatus; and
the master/slave setting unit obtains a busy rate for each library apparatus from the statistical information, and then sets a medium of the library apparatus including the replaced medium as a slave and a medium of the other library apparatus as a master based on the busy rates.

2. A method for maintaining and managing duplexed media using a hierarchical control apparatus of a hierarchical storage system in which a disk array apparatus and a library apparatus having a plurality of media are hierarchically configured, comprising:
holding, in a control unit provided in the hierarchical control apparatus, information in which one of duplexed library apparatuses is set as a master and the other is set as a slave for each medium in each of the duplexed library apparatuses, and statistical information of the library apparatuses including processing time;
detecting, in the control unit, that the statistical information of a medium reaches a predetermined amount, activating an automatic redundant copy unit provided in the control unit to perform an automatic redundant copy by replacing the medium with a free medium, and copying data to the free medium;
setting, in the control unit, when the replaced medium to which the data is copied is included in a library apparatus set as a master, a medium of the other library apparatus including the replaced medium as a slave and a medium of the other library apparatus as a master among the duplexed library apparatuses according to the statistical information; and
reading, in the control unit, data when there is the data in the disk array apparatus at an external request for the data, and, when there is not the data in the disk array apparatus, retrieving the requested data from one of the duplexed library apparatuses including the medium set as a master, and copying the requested data to the disk array apparatus; wherein
the statistical information includes information of setting each of the duplexed library apparatuses as a master or a slave, and information of a total amount of written data, a total amount of read data, total processing time and a total number of mountings of each library apparatus; and
the control unit obtains a busy rate for each library apparatus from the statistical information, and then sets a medium of the library apparatus including the replaced medium as a slave and a medium of the other library apparatus as a master based on the busy rates.

3. A method for maintaining and managing duplexed media using a hierarchical control apparatus of a hierarchical storage system in which a disk array apparatus and a library apparatus having a plurality of media are hierarchically configured, comprising:
- holding, in a control unit provided in the hierarchical control apparatus, information in which one of duplexed media is set as a master and the other is set as a slave, and statistical information of the media including processing time;
- detecting, in the control unit, that the statistical information of a medium reaches a predetermined amount, activating an automatic redundant copy unit provided in the control unit to perform an automatic redundant copy by replacing the medium with a free medium, and copying data to the free medium;
- setting, in the control unit, when the replaced medium to which the data is copied is included in a library apparatus set as a master, a medium of the other library apparatus including the replaced medium as a slave and a medium of the other library apparatus as a master among the duplexed library apparatuses according to the statistical information; and
- retrieving, in the control unit, requested data from one of the duplexed media set as a master, and copying the requested data to the disk array apparatus when there is not the requested data externally requested in the disk array apparatus; wherein the statistical information includes information of setting each of the duplexed library apparatuses as a master or a slave, and information of a total amount of written data, a total amount of read data, total processing time and a total number of mountings of each library apparatus; and the control unit obtains a busy rate for each library apparatus from the statistical information, and then sets a medium of the library apparatus including the replaced medium as a slave and a medium of the other library apparatus as a master based on the busy rates.

* * * * *